(12) United States Patent  (10) Patent No.: US 8,774,595 B2
Chun                      (45) Date of Patent:     Jul. 8, 2014

(54) MULTIMEDIA DEVICE AND A METHOD FOR CONTROLLING THE SAME

(75) Inventor: Wonho Chun, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/365,932

(22) Filed: Feb. 3, 2012

(65) Prior Publication Data

US 2013/0101266 A1    Apr. 25, 2013

(30) Foreign Application Priority Data

Oct. 24, 2011   (KR) ......................... 10-2011-0108524

(51) Int. Cl.
    *H04N 5/92*       (2006.01)
(52) U.S. Cl.
    USPC .......................................... 386/241; 386/248
(58) Field of Classification Search
    None
    See application file for complete search history.

(56) References Cited

U.S. PATENT DOCUMENTS

2002/0010918 A1*  1/2002  Mankovitz et al. ............... 725/1
2003/0198461 A1  10/2003  Taylor et al.
2006/0041909 A1*  2/2006  Kirihara et al. .................. 725/58
2009/0204966 A1*  8/2009  Johnson et al. ............... 718/100
2009/0204996 A1*  8/2009  Kim et al. ........................ 725/54
2010/0175086 A1*  7/2010  Gaydou et al. .................. 725/39
2013/0014173 A1*  1/2013  Corl ................................ 725/54

FOREIGN PATENT DOCUMENTS

| JP | 2003-333451 A | 11/2003 |
| KR | 10-2007-0107545 A | 11/2007 |
| KR | 10-0848721 B1 | 7/2008 |
| KR | 10-2010-0058124 A | 6/2010 |

* cited by examiner

*Primary Examiner* — William C Vaughn, Jr.
*Assistant Examiner* — Eileen Adams
(74) *Attorney, Agent, or Firm* — Birch, Stewart, Kolasch & Birch, LLP

(57) ABSTRACT

A method for controlling a multimedia device includes the steps of outputting a recorded broadcast program, parsing information related to the recorded broadcast program by using broadcast program information, searching for a broadcast program matching with the recorded broadcast program by using the parsed information, comparing a broadcast starting time of the searched broadcast program with an ending time of a broadcast program that is currently being outputted, and, based upon the compared result, when the broadcast starting time and the ending time overlap, playing-back the searched broadcast program when the broadcast program that is currently being outputted is ended.

12 Claims, 13 Drawing Sheets

FIG. 4

| Syntax of Edit Table | Bytes | Bits | Format or Note |
|---|---|---|---|
| EIT Header | 9 | 9*8 | EIT Header |
| num_events_in_section | 1 | 8 | Number of events within the section |
| for (i=0 : i<num_event_in_section: i++ { | | | |
| reserved | 10 | 2 | '11' |
| event_id | | 14 | Identification number of corresponding event |
| start_time | | 32 | Start time of the event |
| reserved | | 2 | '11' |
| ETM_location | | 2 | Presence or Absence of ETM |
| length_in_section | | 20 | Running time of the Event |
| title_length | | 8 | Length of time_text() |
| title_text() | | var | Title of the Event |
| reserved | 2 | 4 | '1111' |
| descriptor_length | | 12 | Length of descriptor |
| descriptor() | | 8*D | AC-3 Audio Descriptor, Caption Service Descriptor, Content Advisory Descriptor Description will be made during the next lesson |
| } | | | |
| CRC-32 | 4 | 32 | 32-bit Cyclic Redundancy Check |

FIG. 5

EIT-0
source_id = 22
num_events_in-section = 3

| Event ID | local Start Time | Length (seconds) | ETM Location | Title | Descriptors |
|---|---|---|---|---|---|
| 51 | 12:30 | 7200 | 01 (this PTC) | Soccer Live | content advisory |
| 52 | 14:30 | 3600 | 00 (no ETM) | Golf Report | closed caption |
| 53 | 15:30 | 9000 | 01 (this PTC) | Car Racing | content advisory |

FIG. 6

| Syntax of ETT Table | Bytes | Bits | Format or Note |
|---|---|---|---|
| ETT Header | 9 | 9*8 | EIT Header |
| ETM_id | 32 | 4 | id distinguishing the extended text message |
| extended_text_message( ) | | var | indicates additional text message in a multiple string structure format |
| CRC-32 | 4 | 32 | 32-bit Cyclic Redundancy Check |

FIG. 9

910 — Name of Broadcast Program ▶
920 — Start    August 09 (Wed.) 8:00 p.m. ▶         901
       End                     8:00 p.m.
930 — Notification              None ▶

None                           ∨ — 1001
5 minutes in advance
10 minutes in advance
15 minutes in advance
30 minutes in advance
1 hour in advance
2 hour in advance
1 day in advance
2 days in advance

MULTIMEDIA DEVICE AND A METHOD FOR CONTROLLING THE SAME

CROSS REFERENCE TO RELATED APPLICATION

This application claims priority to and the benefit of Korean Patent Application No. 10-2011-0108524, filed on Oct. 24, 2011, the disclosure of which is hereby incorporated by reference.

BACKGROUND OF THE INVENTION

1. Field of the Invention

The present invention relates to a multimedia device and a method for controlling the same, more particularly, to a multimedia device and a method for controlling the same enabling a user to continue viewing another episode of a specific broadcast program, after the user has finished viewing a recorded episode of the same broadcast program. Herein, examples of the multimedia device may include network television (TV), smart TV, hybrid broadcast broadband television (HBBTV), internet TV, web TV, internet protocol television (IPTV), and so on.

2. Discussion of the Related Art

With the evolution in the digital technology, a large size of AV data, which are configured of images (video) or sound (audio), may be stored without causing any quality degrading.

Recently, as the price of recording media, such as HDDs or DVDs, each being provided with a large storage capacity of several tens of GB or more, is becoming relatively lower than in the past, HDD based recorders or DVD based recorders are also being introduced to the market. As the capacity of such recording media is becoming larger, a larger number of programs may be recorded and stored in the recording device.

As recording media are now being capable of recording and storing a larger number of programs, due to the extended capacity of the recording media, users are now facing the burden of having to select recorded programs or scheduling recording for a wanted program. In order to lessen the burden of the users, a system that can memorize and store the user's current preferences or profile information, and that can automatically perform recording or recording scheduling (or reservation) of a particular program based upon the memorized and stored information, has recently been developed.

FIG. 1 illustrates an example of viewing a recorded program by using the related art multimedia device according to an embodiment of the present invention. And, hereinafter, the example of viewing the recorded program by using the related art multimedia device will now be described in detail with reference to FIG. 1.

In this example, it is assumed that a user performs scheduled recording of Episode 1 of TV Series A by using the multimedia device (S100), and that the user views the recorded version of Episode 1 of TV Series A at 9:30 p.m. on a weekday night after coming from work (S110). However, if the regular broadcasting of TV Series A starts at 10:00 p.m. (i.e., when the starting time of the regular broadcasting of TV Series A is at 10:00 p.m.), the regular broadcasting of Episode 2 of TV Series A starts while the user is viewing the recorded version of Episode 1 of TV Series A (S120).

Therefore, the user shall decide whether to resume viewing the recorded version of Episode 1 of TV Series A, or whether to skip Episode 1 of TV Series A for the time being and to view the regular broadcasting of Episode 2 of TV Series A (S130). If the user chooses to resume viewing the recorded version of Episode 1 of TV Series A, once the viewing of Episode 1 is finished, the user can only start viewing Episode 2 of TV Series A halfway through the episode (S140), thereby missing the first half of Episode 2. Accordingly, since the user is capable of viewing only a portion of the corresponding episode of the TV series, the user is incapable of being fully absorbed in the broadcast program.

Alternatively, even if the user chooses to view the regular broadcasting of TV Series A, since the user is first required to end the viewing of Episode 1 and then move on to viewing Episode 2, the user experiences the inconvenience of having to view a wanted program by personally manipulating several keys. Furthermore, even though the user can view Episode 2 starting from the beginning of the broadcasting (S150), since the user is viewing Episode 2 without completing the viewing of the recorded version of Episode 1, the problems of causing disconnection in the storyline and disturbing the user's emotional absorption to the TV series still remain.

As described above, when the regular broadcasting of the recorded program starts, while the user is viewing the recorded version of the corresponding program, the user may be capable of viewing the regular broadcasting of the program only halfway through the show, after the user has finished viewing the recorded program, or the user may be capable of viewing the episode that is being broadcasted during the regular broadcasting time starting from the beginning, without completing the viewing of the recorded program. Thus, the user is incapable of being emotionally absorbed into the TV series, and separate manipulation of keys is required, thereby causing the user to experience inconvenience.

SUMMARY OF THE INVENTION

According to an embodiment of the present invention, in case the viewing time of a recorded program overlaps with the regular broadcasting time of the same program, the present invention seeks to provide a multimedia device that can enable the user to automatically view the regular broadcasting of the corresponding TV series starting from the beginning of the episode, after completing the viewing of the recorded episode.

According to another embodiment of the present invention, the present invention seeks to provide a convenient user interface that can provide notifications on regular broadcasting times of the same broadcast programs, while the user is viewing the recorded program.

According to an exemplary embodiment of the present invention, a method for controlling a multimedia device includes the steps of outputting a recorded broadcast program, parsing information related to the recorded broadcast program by using broadcast program information, searching for a broadcast program matching with the recorded broadcast program by using the parsed information, comparing a broadcast starting time of the searched broadcast program with an ending time of a broadcast program that is currently being outputted, and, based upon the compared result, when the broadcast starting time and the ending time overlap, playing-back the searched broadcast program when the broadcast program that is currently being outputted is ended.

According to another exemplary embodiment of the present invention, a multimedia device includes a search unit configured to parse information related to a recorded broadcast program that is currently being outputted, by using broadcast program information, and to search for a broadcast program matching with the recorded broadcast program, a comparison unit configured to compare a broadcast starting time of the searched broadcast program with an ending time of a broadcast program that is currently being outputted, and a controller configured to playback the searched broadcast program once the broadcast program that is currently being outputted is ended, based upon the compared result of the comparison unit, when the broadcast starting time overlap with the ending time.

According to an embodiment of the present invention, in case the viewing time of a recorded program overlaps with the regular broadcasting time of the same program, the present invention seeks to provide a multimedia device that can enable the user to automatically view the regular broadcasting of the corresponding TV series starting from the beginning of the episode, after completing the viewing of the recorded episode.

According to another embodiment of the present invention, the present invention seeks to provide a convenient user interface that can provide notifications on regular broadcasting times of the same broadcast programs, while the user is viewing the recorded program.

A more detailed effect of the present invention will be described later on

BRIEF DESCRIPTION OF THE DRAWINGS

FIG. 4 illustrates a table format of the EIT used by the multimedia device according to the embodiment of the present invention.

FIG. 5 illustrates an EIT used by the multimedia device according to an embodiment of the present invention.

FIG. 6 illustrates a table format of the ETT used by the multimedia device according to the embodiment of the present invention.

FIG. 9 illustrates an example of setting up scheduled viewing in the multimedia device according to an embodiment of the present invention.

FIG. 10 illustrates an example of setting up scheduled viewing in the multimedia device according to another embodiment of the present invention.

DETAILED DESCRIPTION OF THE EMBODIMENTS

The present invention will now be described in more detail with reference to the accompanying drawings.

The suffixes "module" and "unit" that are mentioned in the elements used to describe the present invention are merely used for the purpose of simplifying the description of the present invention. Therefore, the suffixes "module" and "unit" may also be alternately used for the reference of a specific element of the present invention.

Meanwhile, the multimedia device described in the description of the present invention corresponds to, for example, an intelligent display apparatus that is also equipped with a computer supporting function in addition to the broadcast program receiving function. Accordingly, since the display apparatus is committed (or devoted) to its broadcast program receiving function and is also supplemented with an internet browsing function, the display apparatus may be equipped with an interface that can be more conveniently used as compared to an hand-writing type input device, a touch screen or a space remote controller. Furthermore, being supported with a wired or wireless (or radio) internet function, the display apparatus may be connected to (or may access) the internet and a computer, thereby being capable of performing email transmission, web browsing, internet banking or gaming functions. In order to perform such variety of functions, the display apparatus may adopt a standardized OS for general purpose.

Accordingly, since a variety of applications may be easily added to or deleted from a network TV within an OS kernel for general purpose, the network TV described in the description of the present invention may, for example, be capable of performing a wide range of user-friendly functions.

Reference will now be made in detail to the preferred embodiments of the present invention, examples of which are illustrated in the accompanying drawings. However, the embodiment of the present invention described below may be modified to a wide range of modifications. And, therefore, it should be understood that the present invention will not be limited only to the example presented in the description of the present invention set forth herein.

Although the terms used in the present invention are selected from generally known and used terms, the terms used herein may be varied or modified in accordance with the intentions or practice of anyone skilled in the art, or along with the advent of a new technology. Alternatively, in some particular cases, some of the terms mentioned in the description of the present invention may be selected by the applicant at his or her discretion, the detailed meanings of which are described in relevant parts of the description herein. Furthermore, it is required that the present invention is understood, not simply by the actual terms used but by the meaning of each term lying within.

Figure 1:
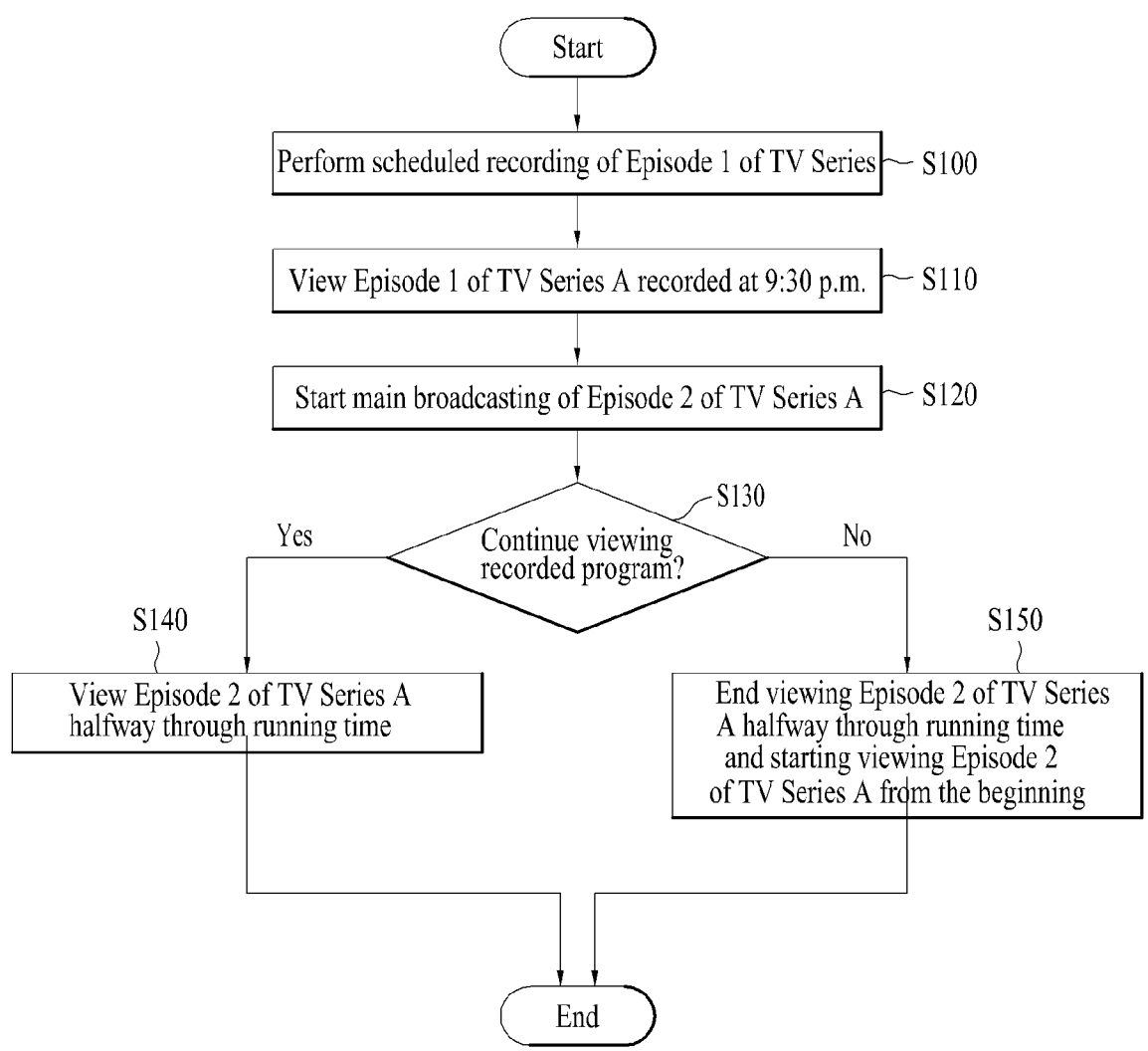
FIG. 1 illustrates an example of viewing a recorded program by using the related art multimedia device according to an embodiment of the present invention.
Figure 2:
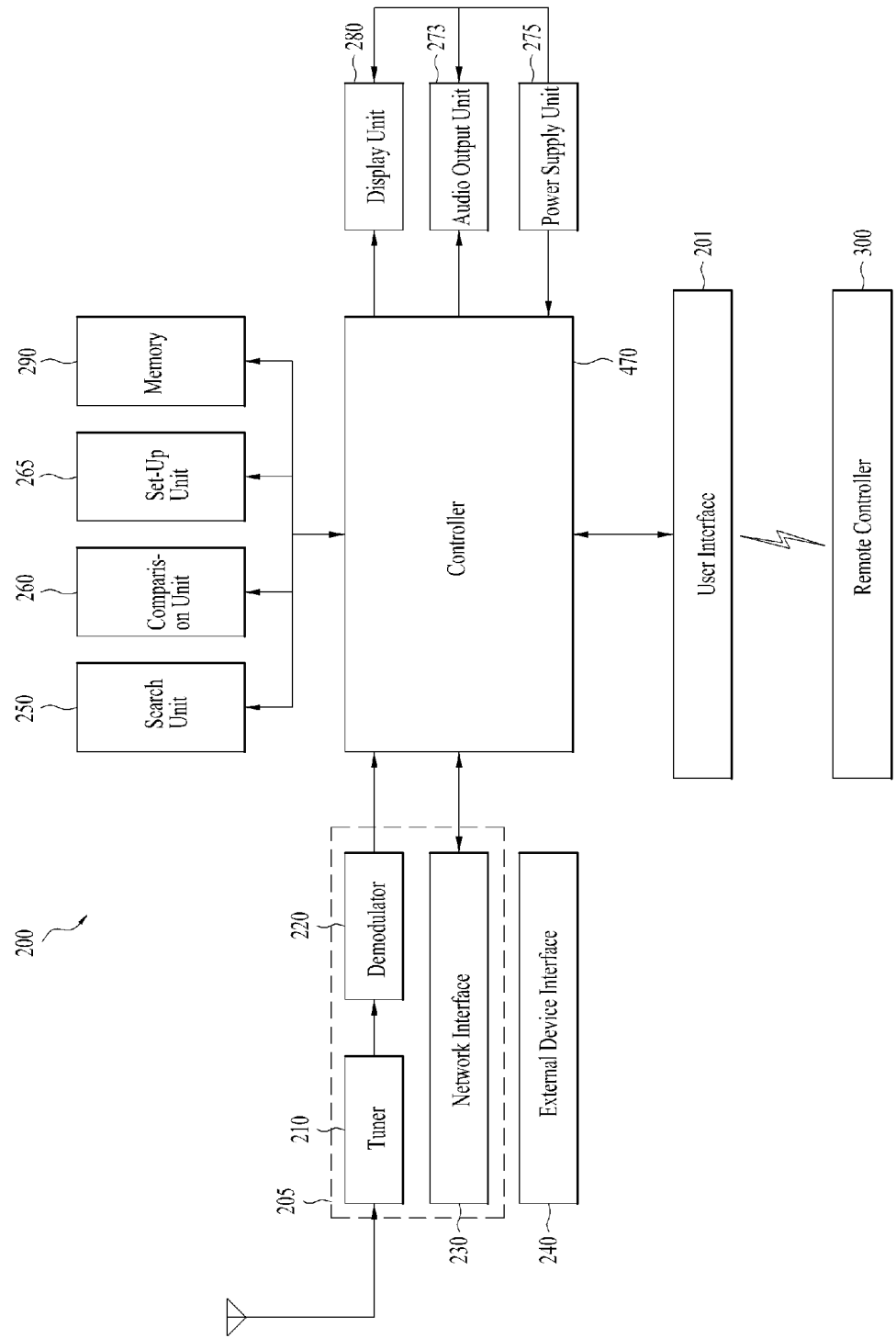
FIG. 2 illustrates a functional view of a multimedia device according to an embodiment of the present invention.

FIG. 2 illustrates a functional block view of a multimedia device according to an exemplary embodiment of the present invention. However, it will be apparent that the modules shown in FIG. 2 are merely exemplary. And, accordingly, some of the modules may be added or deleted depending upon requirements of anyone skilled in the art. Therefore, such addition or deletion may also belong to the scope of the present invention.

As shown in FIG. 2, the multimedia device (200) according to the exemplary embodiment of the present invention includes a broadcast receiver (205), an external device interface (240), a search unit (250), a comparison unit (260), a set-up unit (270), a user interface (271), an audio output unit (273), a power supply unit (275), a display unit (280), and a memory (290).

The broadcast receiver (205) may include a tuner (210), a demodulator (220), and a network interface (230). Evidently, whenever required, the broadcast receiver (205) may be designed to include a tuner (210) and the demodulator (220) and not include the network interface (230). Conversely, the broadcast receiver (205) may also be designed to include the network interface (230) and not include the tuner (210) and the demodulator (220).

Among the RF (Radio Frequency) signals being received through the antenna, the tuner (210) selects an RF broadcast signal corresponding to a channel selected by the user or selects and RF broadcast signal corresponding to all pre-stored channels. The demodulator (220) receives a digital IF (DIF) signal converted by the tuner (210).

A stream signal outputted from the demodulator (220) may be inputted to the controller (270). And, after performing operations, such as demultiplexing, video/audio signal processing, and so on, the controller (270) outputs the processed image to the display unit (280) and outputs the processed sound to the audio output unit (273).

The external device interface (240) may access the external device and the network device. In order to do so, the external device interface (240) may include an A/V input/output unit (not shown) or a wireless communication unit (not shown).

The external device interface (240) may access an external device, such as a digital versatile disk (DVD) player, a Blu-ray disk (BD) player, a gaming device, a camera, a camcorder, a computer (i.e., desktop or laptop computer), and so on, via a wired and/or wireless connection. Furthermore, the external device interface (240) may receive an application or an application list stored in a neighboring external device. Then, the external device interface (240) may deliver the received application or application list to the controller (270) or the memory (290).

In order to access a network via wired connection, the network interface (230) may, for example, be equipped with an Ethernet terminal. Additionally, in order to access a network via wireless connection, the network interface (230) may use communication standards, such as Wireless Lan (WLAN) (or Wi-Fi), Wireless Broadband (Wibro), World Interoperability for Microwave Access (Wimax), High Speed Downlink Packet Access (HSDPA), and so on. Furthermore, among the applications open in the air, the network interface (230) may select and receive a wanted application through the network.

The memory (290) may be configured of an Electrically Erasable Programmable Read-Only Memory (EEPROM). Herein, the memory (290) may store a program for processing and controlling each signal within the controller (270). And, alternatively, the memory (290) may store signal-processed images, sound, or data signals.

Additionally, the memory (290) may also perform the function of temporarily storing the image, sound, or data signals, which are inputted from the external device interface (240) or the network interface (230). Furthermore, the memory (290) may also store an application or a list of applications inputted from the external device interface (240) or the network interface (230).

The user interface (271) may deliver the signal inputted by the user to the controller (270), or the user interface (271) may deliver the signal outputted from the controller (270) to the user. For example, the user interface (271) may receive an input signal, such as a power on/off signal, a channel selection signal, a screen set-up signal, and so on, from the remote controller (300) and may process the received signal. Or, the user interface (271) may process a control signal outputted from the controller (270) so that the processed signal can be transmitted by the remote controller (300).

The display unit (280) respectively converts each of the video signal, data signal, OSD signal, and so on, processed by the controller (270), or each of the image signal, data signal, and so on, received from the external device interface (240) to R, G, and B signals, so as to generate Drive signals. For example, the display unit (280) may be realized as a PDP, an LCD, and OLED, a flexible display, a 3-dimensional (3D) display.

The audio output unit (273) may be configured to receive the audio-processed signals from the controller (270), e.g., stereo signals, 3.1 channel signals, or 5.1 channel signals, and to output the received audio signals in the form of sound. Herein, the audio output unit (273) may be configured of diverse forms of speakers.

The power supply unit (275) supplies the corresponding power throughout the entire multimedia device (200). For example, the power supply unit (275) may supply respective power to the controller (270), which may be configured to have a system on chip (SOC) structure, to the display unit (280), which is configured to display images, and to the audio output unit (273), which is configured to output the processed audio (or sound).

The remote controller (300) transmits a user input to the user interface (271). In order to do so, the remote controller (300) may use Bluetooth, radio frequency (RF) communication, infrared (IR) communication, Ultra Wideband (UWB), ZigBee, and so on. The remote controller (300) will be described in more detail later on with reference to FIG. 11 and FIG. 12.

Most particularly, a multimedia device (200) enabling the user to continue viewing the regular broadcasting of a specific program, after finishing viewing the recorded version (or episode) of the same program, will now be described in detail.

The display unit (280) outputs the recorded broadcast program. Recorded broadcast programs may include broadcast programs recorded by a separate device, such as a PVR (Personal Video Recorder), broadcast programs recorded by a TV, which is supported with a DVR (Digital Video Recorder) function, re-running programs provided by the respective broadcasting company, broadcast programs being provided through "View Again" services supported in IPTVs, broadcast programs being provided as VOD (Video On Demand) services through a network, such as a particular internet website. More specifically, a recorded program collectively refers to all types of broadcast programs that can be viewed at any time of the day other than the regular broadcasting time by using re-running or "View Again" services.

Also, when the display unit (280) outputs the recorded broadcast program, the tuner (210) tunes to the channel of the recorded broadcast program. At least one tuner (210) may be provided in the broadcast receiver, and, in case, multiple tuners (210) are provided in the broadcast receiver, a tuner performing only the function of tuning to the channel of the recorded broadcast program may be separately provided. And, at this point, it is preferable that the tuning process is performed as a background operation.

As described above, by searching for the channel corresponding to the broadcast program that is currently being outputted, and by tuning to the searched channel in advance, once the viewing of the recorded program is completed, the display unit (280) may easily display the regular broadcasting of the same broadcast program.

Additionally, when the broadcast receiver is provided with a separate tuner that is configured to tune to the channel of the recorded broadcast program, the broadcast receiver verifies whether the broadcast signal of the recorded broadcast program corresponds to an analog signal, or whether the broadcast signal corresponds to a digital signal. Thereafter, in case the broadcast signal of the recorded broadcast receiver corresponds to a digital signal, depending upon whether the transmission (or broadcasting) method corresponds to groundwave broadcast transmission, cable broadcast transmission, or satellite broadcast transmission, configurations may be made so that the tuning can be executed only within the corresponding category.

However, if the same broadcast program does not exist in the search unit (250), which will be described in detail later on, the tuner may tune to a channel prior to tuning to the channel of the recorded broadcast program.

Furthermore, in case the broadcast program that is currently being outputted corresponds to a broadcast program being provided from an external source device through a wired/wireless network, such as an IPTV network, and not from a broadcast station, the broadcast receiver may access the external source device through the network interface (230) or the external device interface (240), instead of the tuner (210), thereby enabling the broadcast receiver to receive the contents respective to the broadcast program. More specifically, instead of performing a tuning operation to the channel of the recorded broadcast program, the broadcast receiver may prepare to perform a network access to the external source device of the recorded broadcast program. Hereinafter, an example of tuning to the channel of a recorded broadcast program by using the tuner (210) will be described in detail. However, the present invention will not be limited to the example presented herein.

When the user starts viewing the recorded broadcast program through the display unit (290), the search unit (250) uses broadcast program information so as to parse information related to the recorded broadcast program, thereby being capable of searching for the same broadcast program as the recorded program.

The broadcast program information may include an EIT (Event Information Table) or an ETT (Extended Text Table). And, by using such information, the same broadcast program as the recorded broadcast program may be easily found.

Figure 3:
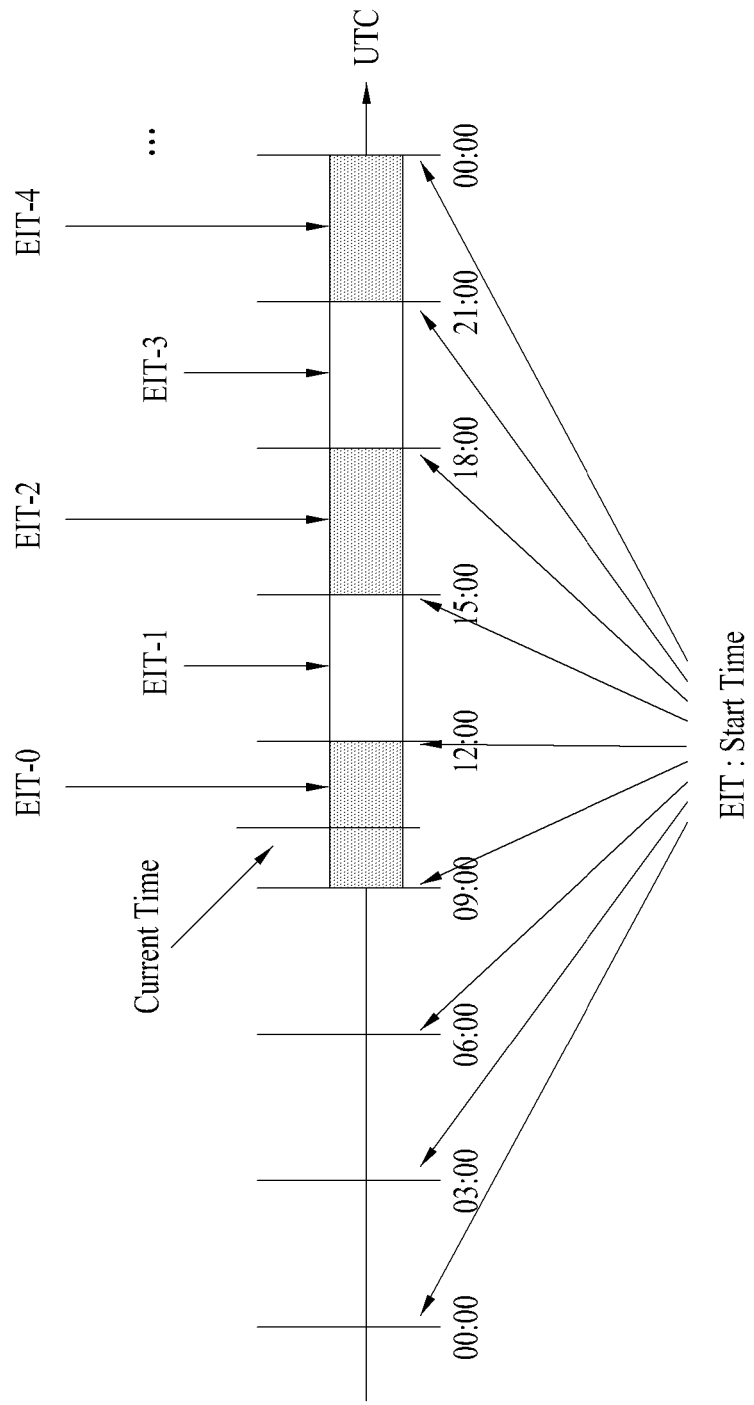
FIG. 3 illustrates an EIT used by the multimedia device according to an embodiment of the present invention.

FIG. 3 illustrates an EIT used by the multimedia device according to an embodiment of the present invention. And, FIG. 4 illustrates a table format of the EIT used by the multimedia device according to the embodiment of the present invention. Herein, the EIT will be described in detail with reference to FIG. 3 and FIG. 4.

The EIT (Event Information Table) includes information on the events of a virtual channel (i.e., title, starting time, running time, and so on). In most cases, one event refers to a typical TV program. However, the definition of an event may be extended so as to include specific data broadcasting sections and also to include other information segments.

As shown in FIG. 3, a maximum of 128 EITs may be transmitted in an EIT-k (k=0, 1, 2 . . . ) format. A PSIP (Program and System Information Protocol) may include a minimum of 4 EITs and a maximum of 128 EITs, wherein each EIT provides event information of a specific time period. An event having a time interval exceeding one or more EITs shall be included in two EITs (e.g., an EIT of a time period within the range of 15:00~18:00 and an EIT of a time period within the range of 18:00~21:00) by using the same event_id (i.e., an identification number of the corresponding event, wherein the identification value has a unique value within a Transport Stream).

If a virtual channel does not belong to a group sharing the same source_id, each virtual channel defined in a VCT (Virtual Channel Table) shall have a matching EIT-k instance. Herein, the virtual channel is identified by table_id, source_id.

Each instance may be divided into a maximum of 256 sections. One section may include multiple event information. However, information on one event cannot be divided into multiple sections. A num_events_in_section (number of events within a section) field corresponds to the first field that follows a protocol_version field of each section.

If the virtual channel does not include an event at a time period that is included in EIT-k, the corresponding EIT instance may correspond to one section, and the value of the num_events_in_section field may be equal to 0. Herein, the event information table (EIT) follows the standard of ISO/IEC 13818-1.

As shown in FIG. 3, EIT-k includes an event list of all channels in 3-hour units (or at 3-hour intervals). And, the starting time of each EIT belongs to 00:00 (midnight), 03:00, 06:00, 09:00, 12:00 (noon); 15:00, 18:00, 21:00.

EIT-0 corresponds to an event list belonging to the current UTC (Coordinated Universal Time) time period. And, EIT-k has an EIT-k instance for each virtual channel. And, in case of groundwave broadcasting, a minimum of 4 EITs (EIT-0, 1 2, 3) and event information of 12 hours shall generally be transmitted. Since the maximum number of EITs corresponds to 128, information corresponding to a total of 16 days may be transmitted.

As described above, the EIT refers to a table storing actual events from the PSIP and information on a program that is being broadcasted through a virtual channel. Therefore, the information of the EIT must be read so that information on a broadcast program, which is actually being broadcasted, and broadcast schedule information can be known, and also so that information (title, starting time, running time) on an event of each virtual channel can be known. Therefore, by using such information, the broadcast program that the user wishes to search for may be easily found.

FIG. 5 illustrates an EIT used by the multimedia device according to an embodiment of the present invention. Herein, EIT-0 is shown as an example of the EIT.

The source_id field has the value of 22, and the source_id field is connected to a virtual channel of the VCT.

Herein, since 3 events are included, the num_events_in_section field is equal to 3. The values of the event_id field is respectively equal to 51, 52, 53, thereby indicating events that are different from one another. And, herein, although the starting time indicates the local time, in an actual service, the start_time field indicates GPS seconds starting from Jan. 6, 1980, 00:00 a.m. (midnight) to the current time. For example, if the current date is Jan. 8, 1980, 00:00 a.m. (midnight), the actual start_time field value may be equal to (1980/1/8 00:00:00-1980/1/6 00:00:00) 172800.

The ETM Location defines whether or not additional information of a channel is to be transmitted to an ETM (Extended Text Message) through an ETT (Extended Text Table). And, herein, the ETM Location may include information on whether or not the ETM is located in a physical channel (PTC) transmitting the PSIP, and information on whether or not the ETM exists.

The Tile follows a multiple string structure, and 2 types of Descriptors are used herein. A content advisory descriptor indicates a level of the corresponding event. Also, a closed caption descriptor is transmitted when the corresponding event executes closed caption broadcasting. And, additional description on the closed caption broadcasting is added herein.

FIG. 6 illustrates a table format of the ETT used by the multimedia device according to the embodiment of the present invention. As an option that is used for describing a virtual channel ETM and an event ETM in detail, the ETT (Extended Text Table) transmits an Extended Text Message (ETM).

The ETM is configured of a multiple string structure and may be displayed in several different languages. Herein, the multiple string structure is used for indicating a text string, and the text string may be used for indicating an event title, a long channel name, an ETT message, and RRT text items. The ETM is advantageous in that it allows a receiving end of the broadcast program to quickly find a desired description without having to pass through numerous table payload analysis processes. As shown in FIG. 6, the ETM is particularly more advantageous in that it can be used for describing a virtual channel in detail or for describing an event in detail.

The search unit (250) may use a regular broadcasting day of the week and a regular broadcasting starting time of a recorded broadcast program so as to search for a broadcast program having the same program name as the recorded broadcast program within a predetermined time period starting from the broadcast starting time on a specific regular broadcasting day of the week. The predetermined time period may vary depending upon the configurations. And, in case the range of the time period is broadly configured, it is advantageous in that adjustments in the broadcasting time, which are made due to breaking news (or newsflash) or unexpected circumstances, may be reflected when configuring the time period.

The memory (290) may store at least one of a name of the recorded broadcast program, a channel number, a regular broadcasting day of the week, a regular broadcasting time, a total running time of the broadcasting program (or duration time), and a currently tuned channel. Herein, the search unit may use the information stored in the memory (290), the EIT (Event Information Table), and the ETT (Extended Text Table), so as to search for a broadcast program having the same name as the recorded broadcast program.

When a broadcast program having the same name as the recorded broadcast program is found, the comparison unit (260) may compare the broadcast starting time of the searched broadcast program with the ending time of the broadcast program that is currently being outputted. Based upon the compared result, in case the broadcasting time overlaps with the current output time, the controller (270) may perform control operations enabling the searched broadcast program to be played-back once the playback of the recorded broadcast program is ended.

More specifically, in case the starting time of the searched broadcast program overlaps with the ending time of the broadcast program that is currently being outputted, the controller (270) may turn on a time shift mode, once the regular broadcasting of the searched broadcast program has started. Thereafter, the controller (270) may store the time point at which the searched broadcast program is to be played-back, so as to allow the corresponding broadcast program to be played-back immediately after the stored time point.

The stored time point, at which the searched broadcast program is to be played back, generally corresponds to the broadcast starting time. However, in order to avoid viewing the commercial messages, the time point may be set-up to 3 minutes after or 5 minutes after the broadcast starting time.

While the user is viewing the recorded program, the regular broadcasting of the searched broadcast program is recorded in real-time. Thereafter, once the viewing of the recorded program is ended, the real-time recorded program may be played back starting from the beginning. Thus, this is advantageous to the user in that the user may sequentially (or continuously) view a wanted program without any interruption.

Figure 7:
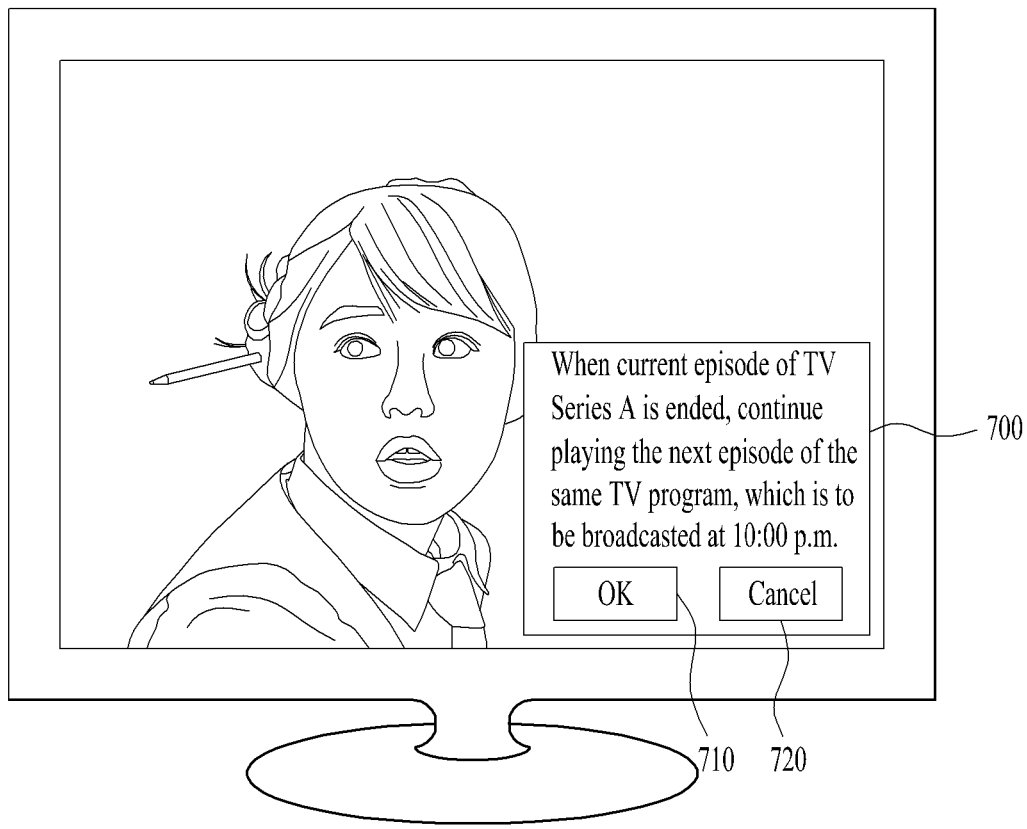
FIG. 7 illustrates an example of notifying a broadcasting schedule from the multimedia device by using an OSD according to an embodiment of the present invention.

FIG. 7 illustrates an example of notifying a broadcasting schedule from the multimedia device by using an OSD according to an embodiment of the present invention. As shown in FIG. 7, once the broadcast program that is currently being outputted is ended, the display unit may display information indicating that the searched broadcast program is scheduled to be outputted through an OSD (On Screen Display) (700). If the user selects an OK menu (710), the regular broadcasting of the searched broadcast program may be automatically displayed, once the recorded program is ended. And, if the user selects a Cancel menu (720), the regular broadcasting of the searched broadcast program may not be automatically displayed, or the screen may shift to a scheduled recording menu.

Meanwhile, even though the search unit (250) has found a broadcast program having the same name as the recorded broadcast program, based upon the comparison result provided by the comparison unit (260), the broadcasting time may not overlap with the current output time. For example, this corresponds to a case when the regular broadcasting is started after the ending time of the recorded broadcast program, which is currently being outputted. At this point, although each broadcasting time does not overlap with one another, since the regular broadcasting cannot be started while the user is viewing the recorded broadcast program, if the interval is not long enough, this information may be notified to the user, or scheduled recording may be configured so as to enhance the user's convenience.

Figure 8:
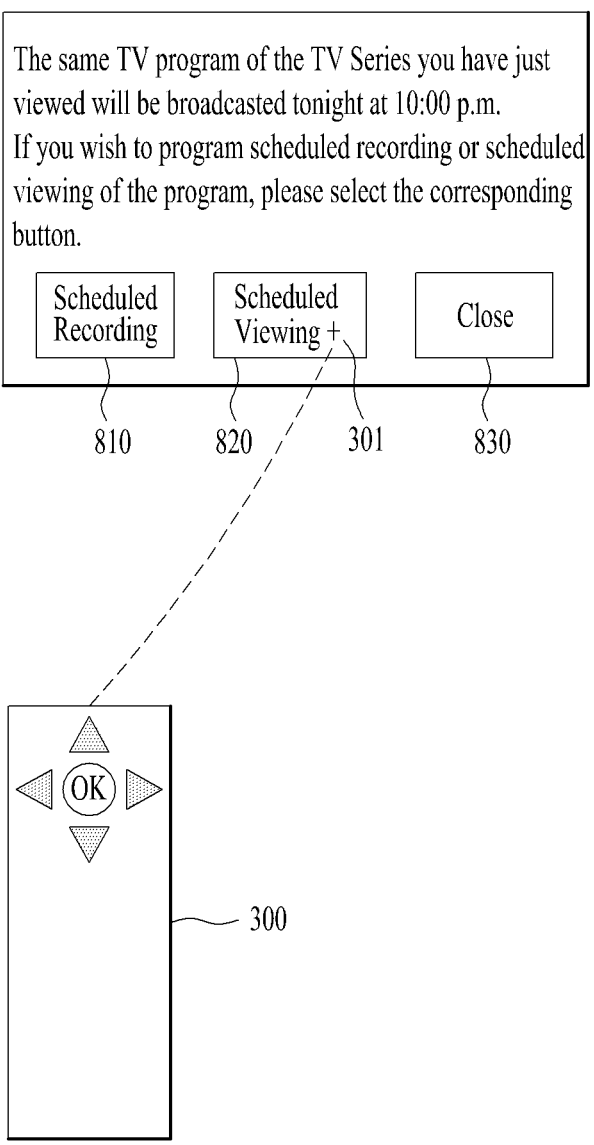
FIG. 8 illustrates an example of notifying a broadcasting schedule from the multimedia device by using an OSD according to another embodiment of the present invention.

FIG. 8 illustrates an example of notifying a broadcasting schedule from the multimedia device by using an OSD according to another embodiment of the present invention. As described above, although the regular broadcasting of a program does not start while the user is viewing the recorded broadcast programs, if the interval is not too long, this information may be notified to the user by using an OSD.

The display unit may display scheduled viewing menu information (820) and scheduled recording menu information (810) on an OSD along with the message indicating the information that the searched broadcast program is scheduled to be displayed. By using a remote controller (300), the user may select a wanted menu through a point (301) corresponding to the remote controller (300). And, when the user does not want scheduled viewing or scheduled recording, the user may select a Close menu (830) and skip scheduled viewing or scheduled recording.

FIG. 9 illustrates an example of setting up scheduled viewing in the multimedia device according to an embodiment of the present invention. Herein, the user may set up the name of a broadcast program (910), and the user may also set up a broadcast starting time and a broadcast ending time so as to set up a scheduled broadcast viewing time (920). Furthermore, the user may also set up whether or not perform notification (930).

FIG. 10 illustrates an example of setting up scheduled viewing in the multimedia device according to another embodiment of the present invention. When the user selects whether or not perform notification (930) in FIG. 9, a menu for setting up the notification time, as shown in FIG. 10, may be displayed on an OSD (1000). When the user uses the remote controller to select a wanted notification time or "None" (1001), the set-up process for the scheduled viewing is completed.

In order to do so, the remote controller may use Bluetooth, radio frequency (RF) communication, infrared (IR) communication, Ultra Wideband (UWB), ZigBee, and so on. Hereinafter, this will be described in more detail with reference to FIG. 11 and FIG. 12.

Meanwhile, when the interval between the ending time for viewing the recorded broadcast program and the starting time for the regular broadcasting of the recorded broadcast program is short, such as between 5 minutes to 10 minutes, some users may wish to automatically view the broadcast program without having to separately set up scheduled viewing or scheduled recording. Therefore, apart from setting up a range of overlapping time, the set-up unit (265) may set-up a program range according to which the receiver can determine the searched program as being identical to the recorded broadcast program. For example, even if the Season of the TV Series is not the same, the receiver may consider the TV Series as being the same. Therefore, the user may naturally move on to the next season and continue viewing the corresponding TV series. Additionally, depending upon the user settings, it is also possible to set-up user configurations so that the receiver can consider other programs, which are related to the same producer or the same starring actor(s)/actress(es), as being the same broadcast program, thereby allowing the user to view such programs in succession.

Figure 11:
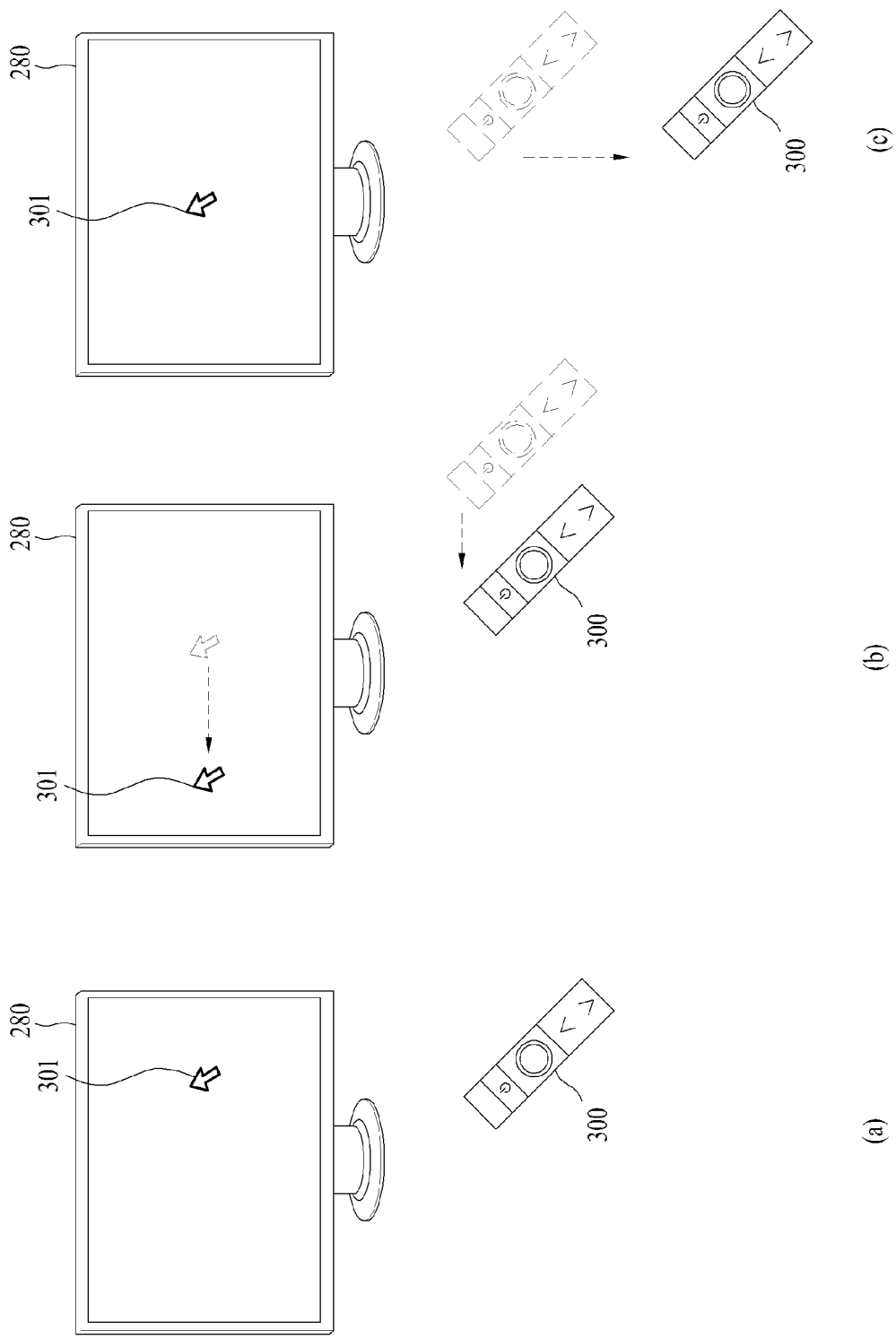
FIG. 11 illustrates external features of a remote controller controlling the multimedia device according to an exemplary embodiment of the present invention.

FIG. 11 illustrates external features of a remote controller controlling the multimedia device according to an exemplary embodiment of the present invention. The external features of the remote controller controlling the multimedia device according to an exemplary embodiment of the present invention will now be described in detail with reference to FIG. 11.

First of all, (a) of FIG. 11 illustrates an example wherein a pointer (301) corresponding to the remote controller (300) is displayed on the multimedia device (200). Furthermore, for example, the display unit (280) shown in FIG. 11 corresponds to the display unit of the multimedia device (200) shown in FIG. 2.

The user may move or rotate the remote controller (300) in an up-and-down (vertical) direction, a left-to-right (horizontal) direction (as shown in (b) of FIG. 11), and a back-and-forth direction (as shown in (c) of FIG. 11). The pointer (301) displayed on the display unit (280) of the multimedia device (200) corresponds to the motion of the remote controller (300). As shown in FIG. 11, since the corresponding pointer (301) moves in accordance with the motion of the remote controller (300) within a 3 dimensional (3D) space, the above-described remote controller (300) may also be referred to as a space remote controller.

(b) of FIG. 11 illustrates an example wherein, when the remote controller (300) moves leftwards, the pointer (301) displayed on the display unit (280) of the multimedia device (200) also moves leftwards with respect to the motion of the remote controller (300).

Information on the motion of the remote controller (300) detected by a sensor of the remote controller (300) is transmitted to the multimedia device (200). The multimedia device (200) may calculate (or compute) coordinates of the pointer (301) from the information on the motion of the remote controller (300). The multimedia device (200) displays the pointer (301) respective to the calculated coordinates.

(c) of FIG. 11 illustrates an example wherein the user moves the remote controller (300) further away from the display unit (280) of the multimedia device (200) while pressing on a specific button within the remote controller (300). Accordingly, the selected area within the display unit (280) corresponding to the pointer (301) may be zoomed-in so as to be displayed in a more enlarged size. Conversely, in case the user moves the remote controller (300) closer to the display unit (280), the selected area within the display unit (280) corresponding to the pointer (301) may be zoomed-out so as to be displayed in a more reduced size.

Therefore, when using the remote controller (300) shown in FIG. 11, options such as Select Menu may be quickly and conveniently selected from the screen shown in FIG. 7 to FIG. 10.

Figure 12:
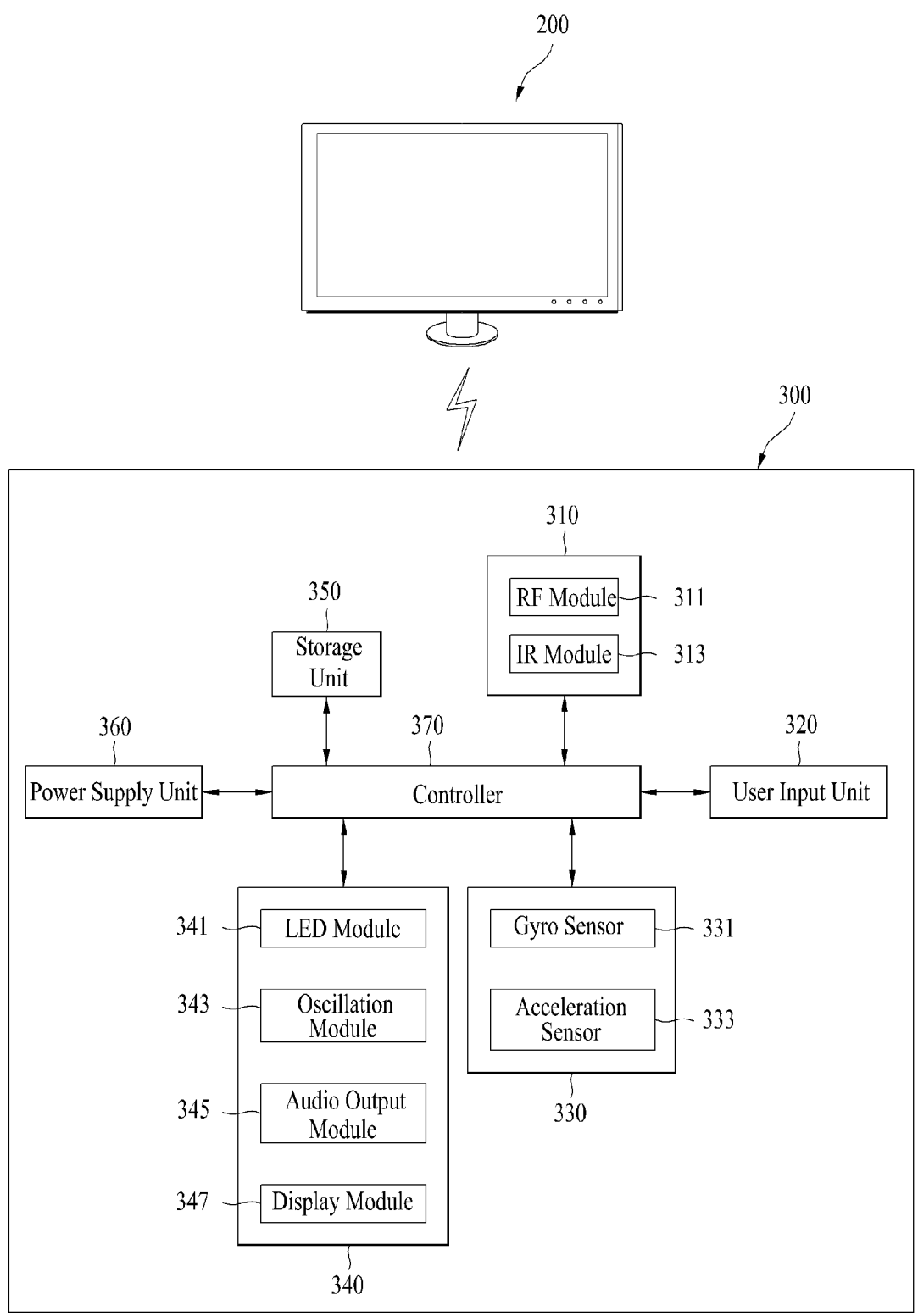
FIG. 12 illustrates a detailed configuration module of the remote controller shown in FIG. 11.

FIG. 12 illustrates a detailed configuration module of the remote controller shown in FIG. 11. Hereinafter, the detailed configuration modules of the remote controller according to the embodiment of the present invention will now be described in detail with reference to FIG. 12.

As shown in FIG. 12, the remote controller (300) includes, for example, a wireless communication unit (310), a user input unit (320), a sensor unit (330), an output unit (340), a storage unit (350), a power supply unit (360), and a control unit (370). The wireless communication unit (310) transmits and receives signals to and from the above-described multimedia device according to the embodiment of the present invention.

According to the embodiment of the present invention, the remote controller (300) may be equipped with a radio frequency (RF) module (311), which can transmit and receive signals to and from the multimedia device (200) in accordance with an RF communication standard. Additionally, the remote controller (300) may also be equipped with an infrared (IR) module (313), which can transmit and receive signals to and from the multimedia device (200) in accordance with an IR communication standard.

According to the embodiment of the present invention, the remote controller (300) transmits signals carrying information on the motions of the remote controller (300) to the multimedia device (200) through the RF module (311).

Also, the remote controller (300) receives a signal transmitted from the multimedia device (200) through the RF module (311). And, whenever required, the remote controller (300) may transmit commands associated with power on/off, channel change, volume change, and so on to the multimedia device (200) through the IR module (313).

The user input unit (320) may be configured of a keypad, buttons, a touchpad, or a touchscreen. The user may manipulate the user input unit (320) so as to input a command associated with the multimedia device (200) to the remote controller (300). Additionally, the sensor unit (330) may be equipped with a Gyro sensor (331) or an acceleration sensor (333).

For example, the Gyro sensor (331) may sense the information associated to the motions of the remote controller (300) based upon x, y, and z axises. And, the acceleration sensor (333) may sense information associated with a movement speed of the remote controller (300). Meanwhile, the acceleration sensor (333) may be further equipped with a distance measurement sensor. And, by using the distance measurement sensor, the acceleration sensor (333) may sense the distance between the remote controller (300) and the multimedia device (200).

The output unit (340) may output a video signal or an audio signal either corresponding to the manipulation of the user input unit (320) or corresponding to the signal transmitted from the multimedia device (200). The user may recognize whether or not the user input unit (320) has been manipulated or whether or not the multimedia device (200) has been controlled through the output unit (340).

For example, when the user input unit (320) is manipulated, or when a signal is transmitted and received to and from the multimedia device (200) through the wireless communication unit (310), the output unit (340) may be provided with an LED module (341) that is enlightened, an oscillation module (343) that generates oscillation, a sound output module (345) that outputs sound, or a display module (347) that outputs images.

The storage unit (350) may store diverse types of programs, application data, and so on that are required for controlling or operating the remote controller (300). And, if the remote controller (300) receives and transmits signals via wireless communication through the multimedia device (200) and the RF module (311), the remote controller (300) and the multimedia device (200) may transmit and receive signals through a predetermined frequency band.

The power supply unit (360) supplies power to the remote controller (300). In case the remote controller (300) does not move for a predetermined period of time, by ceasing (or stopping) the power supply, the power supply unit (360) may reduce a wasted amount of power. The power supply unit (360) may resume the power supply, when a predetermined key provided in the remote controller (300) is manipulated.

Finally, the control unit (370) performs the overall functions associated with the control of the remote controller (300). Herein, the control unit (370) may transmit a signal corresponding to a predetermined key manipulation of the user input unit (320) or a signal corresponding to the movements of the remote controller (300) sensed by the sensor unit (330) to the multimedia device (200) through the wireless communication unit (310).

Most particularly, the control unit (370) may be designed to control the RF module (311) or the IR module (313), so as to transmit an input signal related to the message displayed on the display unit (280) of the multimedia device (200) to the multimedia device (200). As described above, since a command respective to a specific movement of the remote controller (300) may be transmitted, the present invention has a unique advantage of enabling the user to accurately select any one of the neighboring areas.

Figure 13:
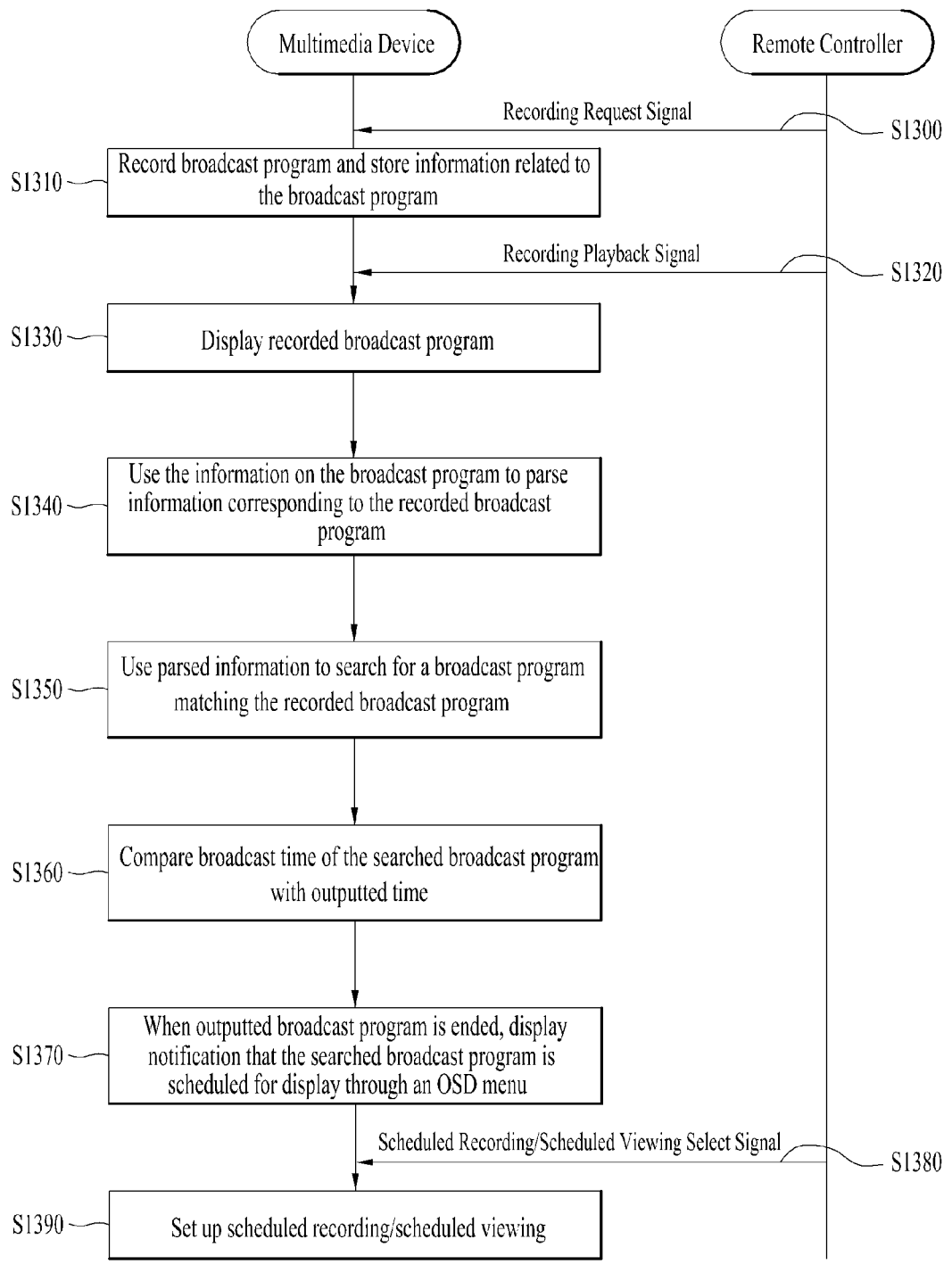
FIG. 13 illustrates a flow chart showing a data transmission protocol between the multimedia device and the remote controller according to the embodiment of the present invention.

FIG. 13 illustrates a flow chart showing a data transmission protocol between the multimedia device and the remote controller according to the embodiment of the present invention. A data transmission protocol between the above-described remote controller and the multimedia device according to the embodiment of the present invention will now be described in detail with reference to FIG. 13.

The user uses the remote controller to transmit a Recording Request signal to the multimedia device (S1300). The multimedia device records a broadcast program corresponding to the Recording Request signal and stores information related to the broadcast program that is being recorded (S1310). The information related to the broadcast program may include at least one of a program name, a channel number, the day of the week, a broadcast starting time, and a total broadcasting time (or duration time).

Also, in addition to the request signal for recording the current broadcast program, the Recording Request signal may also include a request signal for scheduling automatic recording. In case of the signal requesting for a scheduled recording, the scheduled recording may be performed in accordance with the Recording Request scheduling signal received from the remote controller based upon an EPG (Electronic Program Guide), which is distributed from the broadcasting station.

The EPG is configured of attribute information on the broadcast contents, such as the broadcasting day, the broadcasting channel, actor/actress information, program introduction, and so on, of each set of broadcast content. Therefore, the multimedia device may automatically select scheduling (or reservation) target contents respective to the Recording Request signal by using the EPG.

When the user uses the remote controller to transmit a playback signal of the recorded program to the multimedia device (S1320), the multimedia device displays the recorded broadcast program (S1330).

Meanwhile, as the multimedia displays the recorded broadcast program, the multimedia device parses information corresponding to the recorded broadcast program by using the broadcast program information as the background information (S1340). The broadcast program information may use the EIT, the ETT, and so on, and, since the respective description has already been described above, a detailed description of the same will be omitted for simplicity.

Thereafter, a broadcast program matching with the recorded broadcast program is searched for by using the parsed information (S1350), and the broadcasting time of the searched broadcast program is compared with the ending time of the recorded broadcast program, which is currently being outputted (S1360).

Then, based upon the compared result, when the ending time of the recorded broadcast program, which is currently being outputted, overlaps with the broadcast starting time of the searched broadcast program, while the recorded broadcast program is being displayed, information indicating that the searched broadcast program is scheduled to be displayed may be simultaneously displayed on an OSD menu (S1370). Accordingly, the user may transmit a Verification signal to the multimedia device by using the remote controller.

However, based upon the compared result, when the ending time of the recorded broadcast program, which is currently being outputted, does not overlap with the broadcast starting time of the searched broadcast program, a scheduled recording select signal or a scheduled viewing select signal may be received through the remote controller (S1380). Accordingly, the multimedia device may set up scheduled recording or scheduled viewing (S1390), and, at the corresponding time, the multimedia device may receive a broadcast signal of the scheduled broadcast program, so as to perform recording or display.

Figure 14:
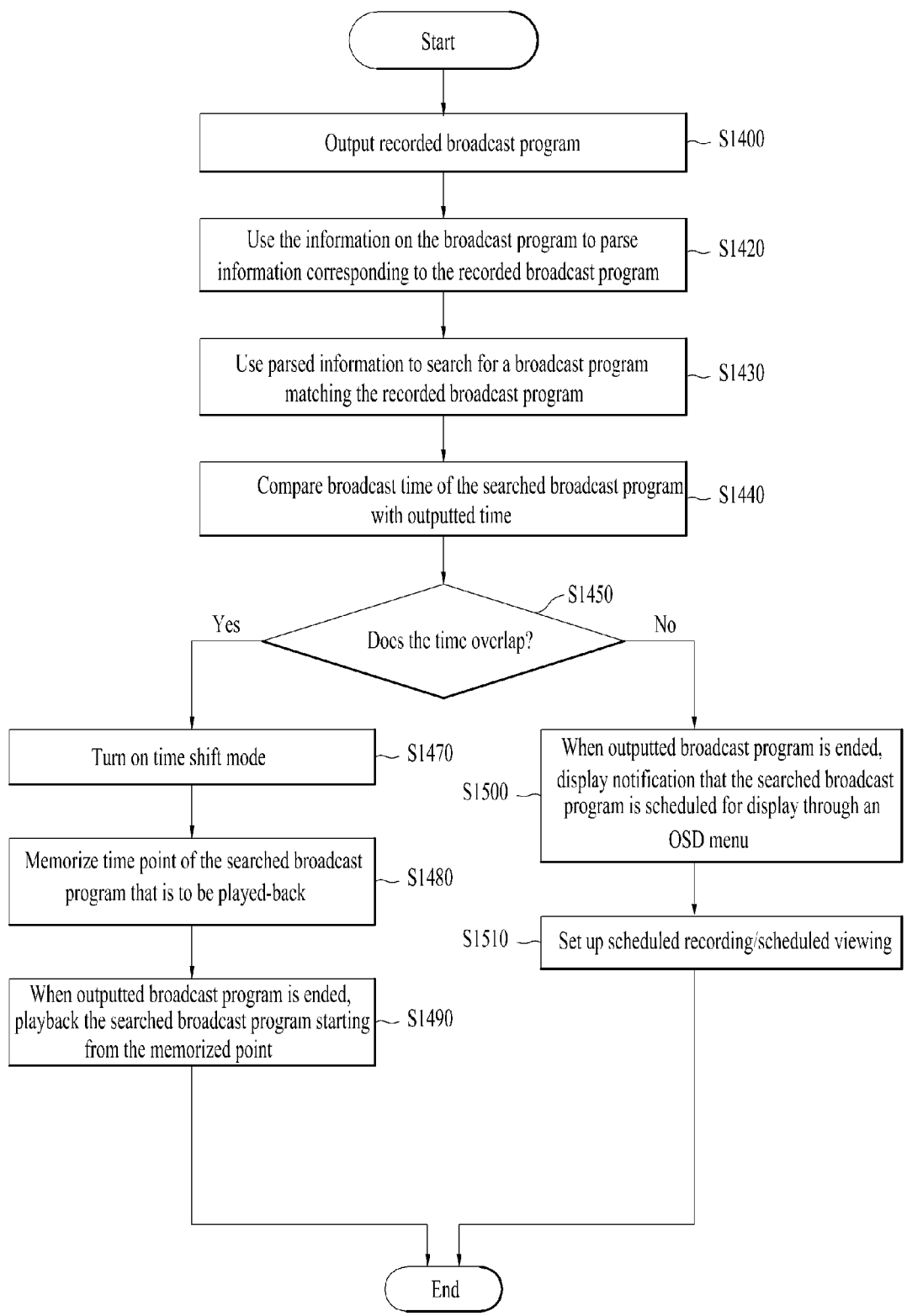
FIG. 14 illustrates a flow chart showing the process steps of a method for controlling the multimedia device according to an embodiment of the present invention.

FIG. 14 illustrates a flow chart showing the process steps of a method for controlling the multimedia device according to an embodiment of the present invention. Hereinafter, the method for controlling the multimedia device according to an embodiment of the present invention will now be described in detail with reference to FIG. 14. Detailed description for the parts that are similar to those of the above-described multimedia device will be omitted for simplicity.

The recorded broadcast program is outputted (S1400), and the multimedia device tunes to the channel of the recorded broadcast program as the background operation. At this point, at least two or more tuners may be used, and, while the tuning is performed, the multimedia device uses broadcast program information so as to parse the information corresponding to the recorded broadcast program (S1420).

However, as described above, if the recorded broadcast program corresponds to a program being transmitted from an external source device through an IPTV network, instead of tuning to a respective channel, the multimedia device prepares for an access to the external source device, thereby being capable of parsing the information corresponding to the recorded broadcast program.

The multimedia device then uses the parsed information to search for a broadcast program matching with the recorded broadcast program (S1430). Herein, the broadcast program information may include an EIT (Event Information Table) or an ETT (Extended Text Table), and by using the EIT or ETT, the multimedia device may search for the same broadcast program as the recorded broadcast program.

For example, by using the regular broadcasting day of the week and broadcast starting time of the recorded broadcast program, a search for a broadcast program having the same program name as the recorded broadcast program may be performed within a predetermined time period range starting from the broadcast starting time on the regular broadcasting day of the week.

Additionally, by being equipped with a separate set-up unit, the multimedia device may set-up a similar program, which may be considered as the same broadcast program as the recorded broadcast program, so that all similar programs can also be searched. In this case, by using the set-up unit, a parsing range for the information corresponding to the recorded broadcast program may be extended. Alternatively, the parsing range may be limited to the recorded broadcast program. However, by extending the search range for searching the same broadcast program, all similar programs may also be searched.

Nevertheless, if a matching broadcast program cannot be searched, the search process may be repeated after a predetermined time, so that an updated broadcasting schedule can be reflected when repeating the search process. Also, if a matching broadcast program cannot be found even after a predetermined number of repeated search processes, the multimedia device may re-tune to a channel prior to tuning to the channel of the recorded broadcast program.

Meanwhile, the broadcasting time of the searched broadcast program is compared with the current outputting time (S1440). More specifically, the starting time of the searched broadcast program is compared with the viewing ending time of the recorded broadcast program, which is currently being outputted.

Then, based upon the compared result, the multimedia device verifies whether or not the broadcast starting time of the searched broadcast program overlaps with the ending time of the recorded broadcast program (S1450). Herein, overlapping indicates that the regular broadcasting of the searched broadcast program starts before the viewing of the recorded broadcast program is ended. However, by configuring the overlapping range differently, when a broadcast program that is searched within a predetermined time range starts after the viewing of the recorded broadcast program has ended, without having the broadcasting times of each program overlap one another, this may also be considered as an overlapping of the broadcasting times.

Based upon the verified result, when the broadcasting time overlaps with the current output time (S1450-Yes), the multimedia device is fixed to the tuned channel, and the multimedia device turns on the time shift mode (S1470). Also, the multimedia device memorizes the time point at which the searched broadcast program is to be played-back (S1480). Thereafter, once the viewing of the recorded broadcast program has ended, the playback of the searched broadcast program may immediately follow (S1490).

Accordingly, this is advantageous in that the user may continuously view wanted broadcast programs in succession without being emotionally interrupted and without having to perform any additional manipulation. However, in order to enhance the user's convenience, once the output of the current broadcast program is ended, the multimedia device may display notification information indicating that the searched broadcast program is scheduled to be broadcasted through an OSD (On Screen Display).

Conversely, based upon the verified result, when the broadcasting time does not overlap with the current output time (S1450-No), once the broadcast program that is currently being outputted is ended, the multimedia device may display notification information indicating that the searched broadcast program is scheduled to be broadcasted through the OSD (S1500). Also, the multimedia device may configure scheduled recording or scheduled viewing, including the scheduled viewing menu information or the scheduled recording menu information respective to the scheduled broadcast program (S1510).

Furthermore, although the drawings have been distinguished and divided in order to facilitate the description of the present invention, the present invention may be designed to form a new embodiment by combining some of the above-described embodiments of the present invention. Moreover, whenever required by anyone skilled in the art, the scope of the present invention includes designing a recording medium readable by a computer, the computer having a program for executing the above-described embodiments of the present invention recorded therein.

Meanwhile, the multimedia device and the method for controlling the same according to the present invention may be realized as a code that can be read by a processor provided in the image display device in a recording medium that can be read by a processor. The recording medium that can be read by the processor includes all types of recording devices storing data that can be read by the processor. Examples of the recording media that can be read by a processor may include ROMs, RAMS, CD-ROMs, magnetic tapes, floppy disks, optical data storing devices, and so on. Also, an exemplary recording medium being realized in the form of a carrier wave, such as a transmission via Internet, may also be included. Also, the recording medium that can be read by a processor may be scattered within a computer system, which is connected through a network. And, a code that can be read by the processor may be stored and executed by using a dispersion (or scattering) method.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. It is also apparent that such variations of the present invention are not to be understood individually or separately from the technical scope or spirit of the present invention.

Also, a device invention and a method invention are both described in this specification of the present invention. Therefore, whenever required, the description of both inventions may be supplementarily applied.

What is claimed is:

1. A method for controlling a multimedia device, comprising:

outputting a broadcast program;

parsing information related to the broadcast program using broadcast program information;

automatically searching for a broadcast program having the same program name as the currently output broadcast program by using the parsed information;

comparing a broadcast starting time of the automatically searched broadcast program with an ending time of the currently output broadcast program;

based upon the compared result, when the broadcast starting time and the ending time overlap, turning on a time shift function and memorizing a time point at which the automatically searched broadcast program is to be played back;

outputting an OSD (On Screen Display) indicating that the automatically searched broadcast program is scheduled to be displayed when the currently output broadcast program is ended; and playing-back the automatically searched broadcast program from the memorized time point when the output broadcast program is ended.

2. The method of claim 1, wherein, in the step of outputting the OSD indicating that the automatically searched broadcast program is scheduled to be displayed, any one of a notification information indicating that the automatically searched broadcast program is scheduled to be displayed, a scheduled viewing menu information, and a scheduled recording menu information are displayed on the OSD.

3. The method of claim 1, wherein the broadcast program information includes an EIT (Event Information Table) or an ETT (Extended Text Table).

4. The method of claim 1, wherein the step of automatically searching for the broadcast program having the same program name as the output broadcast program includes automatically searching by using a regular broadcasting day of a week and a regular broadcasting starting time of the output broadcast program, and wherein, in the step of automatically searching for the broadcast program having the same program name as the output broadcast program, the broadcast program having the same program name as the output broadcast program is automatically searched within a predetermined time period starting from the regular broadcast starting time on the regular broadcasting day of the week.

5. The method of claim 1, wherein, in the step of automatically searching for the broadcast program having the same program name as the output broadcast program, when the broadcast program having the same program name as the output broadcast program cannot be searched, the automatic searching process is repeated after a predetermined period of time.

6. A multimedia device, comprising:
a search unit configured to parse information related to a broadcast program that is output, by using broadcast program information, and automatically search for a broadcast program having the same program name as the currently output broadcast program;

a comparison unit configured to compare a broadcast starting time of the automatically searched broadcast program with an ending time of the currently output broadcast program; and a controller configured to:
turn on a time shift and memorize a time point at which the automatically searched broadcast program is to be played back when the broadcast starting time overlaps with the ending time based upon the compared result of the comparison unit, output an OSD (On Screen Display) indicating that the automatically searched broadcast program is scheduled to be displayed when the output broadcast program is ended, on a display unit, and playback the automatically searched broadcast program from the memorized time point the output broadcast program is ended.

7. The multimedia device of claim 6, wherein the broadcast program information includes an EIT (Event Information Table) or an ETT (Extended Text Table).

8. The multimedia device of claim 6, wherein the search unit uses a regular broadcasting day of a week and a regular broadcasting starting time of the output broadcast program, so as to automatically search for a broadcast program having the same program name as the output broadcast program within a predetermined time period starting from the regular broadcast starting time on the regular broadcasting day of the week.

9. The multimedia device of claim 6, wherein the output broadcast program is output by the display unit.

10. The multimedia device of claim 6, wherein the display unit indicates any one of a notification information indicating that the automatically searched broadcast program is scheduled to be displayed, a scheduled viewing menu information, and a scheduled recording menu information on an OSD.

11. The multimedia device of claim 6, further comprising:
a set up unit configured to configure an overlapping range that is to be considered as a case when the broadcast starting time overlaps with the ending time.

12. The multimedia device of claim 6, further comprising:
a memory configured to store at least one of a name of the output broadcast program, a channel number, a regular broadcasting day of a week, a regular broadcasting time, a total running time of the output broadcasting program (or duration time), and a currently tuned channel.

* * * * *